(12) United States Patent
Terasaki et al.

(10) Patent No.: US 6,432,516 B1
(45) Date of Patent: Aug. 13, 2002

(54) MOISTUREPROOFING FILM AND ELECTROLUMINESCENT DEVICE

(75) Inventors: Syuji Terasaki; Hisaaki Terashima; Satoru Matsunaga; Masamichi Akatsu, all of Ibaraki (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 0 days.

(21) Appl. No.: 09/403,130

(22) PCT Filed: Apr. 17, 1998

(86) PCT No.: PCT/JP98/01781

§ 371 (c)(1),
(2), (4) Date: Oct. 14, 1999

(87) PCT Pub. No.: WO98/46424

PCT Pub. Date: Oct. 22, 1998

(30) Foreign Application Priority Data

Apr. 17, 1997 (JP) .............................. 9-114216

(51) Int. Cl.⁷ ................................ B32B 7/12
(52) U.S. Cl. ................. 428/195; 428/200; 428/349; 428/351; 428/500; 428/690; 428/908.8; 428/913; 428/917
(58) Field of Search ................. 428/195, 200, 428/349, 351, 500, 908.8, 913, 690, 917

(56) References Cited

U.S. PATENT DOCUMENTS

| 5,112,673 A | 5/1992 | Sawada et al. |
| 5,498,662 A | 3/1996 | Tanaka et al. |
| 5,552,479 A | 9/1996 | Tanaka et al. |

FOREIGN PATENT DOCUMENTS

| JP | 2-258251 | 10/1990 |
| JP | 6-220221 | 8/1994 |
| JP | 7-135080 | 5/1995 |
| JP | 7-165942 | 6/1995 |

*Primary Examiner*—Cynthia H. Kelly
*Assistant Examiner*—Ling Xu
(74) *Attorney, Agent, or Firm*—Dinsmore & Shohl LLP

(57) ABSTRACT

A moistureproof film composed of a transparent multi-layer film having a layer structure that thin metal or nonmetal oxide layers (C) are respectively arranged directly or through an adhesive layer (B) on both sides of a hygroscopic resin layer (A), and having a water vapor transmission rate of at most 0.05 g/m²·24 hr as measured at a temperature of 60° C. and a relative humidity of 90%, and a quantity of water vapor transmission for 50 hours of at most 0.15 g/m² as measured at a temperature of 40° C. and a relative humidity of 100%, a production process thereof, an EL device sealed with the moistureproof film, and a fabrication process of the EL device.

20 Claims, 3 Drawing Sheets

MOISTUREPROOFING FILM AND ELECTROLUMINESCENT DEVICE

TECHNICAL FIELD

The present invention relates to a moistureproof film having high moistureproof performance, and more particularly to a moistureproof film suitable for use as a packaging film for sealing an electroluminescence device, and a production process thereof. The present invention also relates to an electroluminescence device sealed with this moistureproof film and a fabrication process thereof.

BACKGROUND ART

An action that an electric field is applied to a solid luminescent compound (phosphor) to convert electric energy into luminescent energy is referred to as electroluminescence (EL). EL can be classified into a thin film type and a dispersion type from the basic device structure thereof. The thin film type EL device comprises a luminescent layer composed of a thin film of a phosphor. The dispersion type EL device comprises a luminescent layer in which a powdery phosphor is dispersed in an organic or inorganic binder. An EL device comprises a device body with a luminescent layer held between a pair of electrodes directly or through an insulating layer, and a transparent electrode is used as at least one of the pair of electrodes. The EL device is divided into a DC drive type (DC type) and an AC drive type (AC type) according to whether drive voltage is direct current or alternating current.

The uses of the EL device are about to spread as, for example, a back light for liquid crystal display devices, a surface illuminant for all-night lights, road traffic signs, night advertisement, decorations and the like, or a flat display such as a terminal display used in computers or word processors, or an image displays used in televisions, making good use of its features that it is thin in film thickness and light in weight.

When the phosphor forming the luminescent layer absorbs moisture or water vapor, the luminance thereof is impaired. Therefore, the EL device generally has a structure that a device body, in which the luminescent layer has been arranged between a pair of electrodes, has been sealed with a transparent moistureproof material. As the moistureproof material for the EL device, there has heretofore been used a moistureproof film composed mainly of a poly (chlorotrifluoroethylene) (PCTFE), or a glass base. Of these, the glass base has a limit to the formation of a thin film or weight reduction and also involves a problem that it is lacking in flexibility. On the other hand, PCTFE is high in cost because it is a fluorocarbon resin. Besides, the moistureproof performance of the PCTFE film is markedly deteriorated when atmospheric temperature exceeds 50° C. Therefore, the PCTFE film has involved a problem that the life of an EL device making use of such a film is extremely shortened at high temperatures. In addition, there is a reason that the access to raw materials for fluorocarbon resins is expected to be hard in future. There has thus been a demand for development of another resin material substitutable for PCTFE.

As such other resin materials, polyvinylidene chloride and polyvinyl alcohol have heretofore been investigated. Resin films, on which a vapor-deposited silicon oxide layer has been provided, have also been investigated. However, all these materials are insufficient in moistureproof performance compared with the case where the PCTFE film is used, and fail to lengthen the life of an EL device. Therefore, they do not come to be put to practical use.

DISCLOSURE OF THE INVENTION

It is an object of the present invention to provide a moistureproof film which has moistureproof performance to the degree equal to or higher than the conventional moistureproof film composed mainly of poly (chlorotrifluoroethylene) film, exhibits moistureproof performance stable to changes in environmental temperature and humidity, may be formed in a thin and light-weight film and is suitable for use in sealing an EL device.

Another object of the present invention is to provide a production process of the moistureproof film having such high moistureproof performance.

A further object of the present invention is to provide an EL device sealed with the moistureproof film having such high moistureproof performance and a fabrication process thereof.

The present inventors have carried out an extensive investigation with a view toward overcoming the above-described problems involved in the prior art. In the course thereof, attention has been paid to a polyvinyl alcohol film (hereinafter abbreviated as "PVA film") on which a vapor-deposited layer composed of a metal or nonmetal oxide typified by a thin silicon oxide layer was formed. The PVA film with such a vapor-deposited layer formed thereon (hereinafter abbreviated as "vapor-deposition PVA film) is transparent and extremely low in water vapor transmission rate which can be used as a measure of water vapor barrier property. However, the vapor-deposition PVA film is poor in practical moistureproof performance and is hence not used effectively as a moistureproof film for packaging an EL device unlike the PCTFE film.

In fact, the present inventors have used a multi-layer film comprising the vapor-deposition PVA film has been used as a moistureproof film to seal an EL device. As a result, it has been found that the luminance of the EL device is markedly deteriorated when the EL device is exposed to high-humidity conditions. The present inventors have carried out a further investigation as to the reason why only a moistureproof film poor in practical performance can be provided though the multi-layer film comprising the vapor-deposition PVA film has an extremely low water vapor transmission rate in itself. As a result, it has been presumed that in the vapor-deposition PVA film or the multi-layer film comprising the vapor-deposition PVA film, the moisture absorption of PVA, which is a hygroscopic resin, is unavoidable under ordinary conditions for production, and so a PVA film contains some water, and that fact may adversely affect the practical performance.

It has thus been surprisingly found that when a multi-layer film of a structure that thin silicon oxide layers are respectively arranged directly or through an adhesive layer on both sides of a PVA film is used, and the PVA film, vapor-deposition PVA film or multi-layer film used is thoroughly dried to a substantially absolute dry state, a novel moistureproof film which has moistureproof performance to the degree equal to or higher than the moistureproof film composed mainly of PCTFE film can be provided.

The present inventors have found that the moistureproof performance of the vapor-deposition PVA film or the multi-layer film comprising the vapor-deposition PVA film cannot be evaluated simply by the water vapor transmission rate thereof and should be evaluated by tempering the water vapor transmission rate with the quantity of water vapor transmission (the measuring method thereof will be described subsequently). Multi-layer films of the structure that thin silicon oxide layers are respectively arranged directly or through an adhesive layer on both sides of a PVA film, one of which was produced under ordinary conditions for production and the other of which was thoroughly dried in accordance with the production process of the present invention, have been separately used as a moistureproof film to fabricate respective EL devices, and the quantities of water vapor transmission in such devices have been actually measured. As a result, it has been found that there is an extremely great difference in the quantity of water vapor transmission of the moistureproof films between both devices. In the EL device making use of the multi-layer film produced under the ordinary conditions for production, the retention of luminance is greatly lowered when it is exposed to a high-humidity environment, and the luminance may be lost in an extreme case. On the other hand, the use of the moistureproof film according to the present invention, comprising the multi-layer film thoroughly dried permits the provision of an EL device which exhibits high retention of luminance over a long period of time even when it is exposed to a high-humidity environment.

The reason why the moistureproof film according to the present invention exhibits such high moistureproof performance, or the mechanism thereof is not always wholly clarified at the present stage. However, the present inventors are considered to be as follows. The conventional vapor-deposition PVA film absorbs moisture under ordinary conditions for production and hence contains some water. This is called "initial water absorption". The water vapor transmission rate of the vapor-deposition PVA film or the multi-layer film comprising the vapor-deposition PVA film is not very affected by the initial water absorption, but the quantity of water vapor transmission is greatly affected thereby. If the quantity of water vapor transmission is great, only a moistureproof film poor in practical moistureproof performance can be provided. On the other hand, when the vapor-deposition PVA film or the multi-layer film comprising the vapor-deposition PVA film is thoroughly dried, the initial water absorption is lowered, and moreover the resistance to water vapor transmission of the PVA film itself is markedly improved by the aging effect and the like. As will hereinafter be described, it is further presumed that the improvement of the resistance to water vapor transmission by the vapor-deposition layer and adhesive layers may contribute to the improvement of moistureproof performance. Such an effect of markedly improving the moistureproof performance by the drying treatment is too marked to be anticipated by the prior art.

The multi-layer film of the structure that the thin metal or nonmetal oxide layers are respectively arranged directly or through an adhesive layer on both sides of the PVA film exhibits an excellently low water vapor transmission rate. However, the desired dry state of the interposed PVA film (typical hygroscopic resin layer) and in its turn the multi-layer film cannot be simply achieved due to the obstruction by the water vapor barrier performance inherent in the thin oxide layers present on both sides. However, once the desired dry state is achieved by thoroughly conducting a drying treatment at high temperature for at least 10 hours, or over at least 100 hours if circumstances require, a moistureproof film, which can stably retain an excellently low quantity of water vapor transmission, can be provided in cooperation with its low water vapor transmission rate.

The moistureproof film according to the present invention undergoes no adverse influence on its moistureproof performance even by changes in environmental temperature and humidity. It is also possible to impart flexibility to the film by suitably selecting the layer structure thereof. The present invention has been led to completion on the basis of these findings.

According to the present invention, there is thus provided a moistureproof film composed of a transparent multi-layer film having a layer structure that thin metal or nonmetal oxide layers (C) are respectively arranged directly or through an adhesive layer (B) on both sides of a hygroscopic resin layer (A), wherein the moistureproof film has:

(1) a water vapor transmission rate of at most 0.05 $g/m^2 \cdot 24$ hr as measured at a temperature of 60° C. and a relative humidity of 90%; and (2) a quantity of water vapor transmission for 50 hours of at most 0.15 $g/m^2$ as measured at a temperature of 40° C. and a relative humidity of 100%.

According to the present invention, there is also provided a process for producing a moistureproof film composed of a transparent multi-layer film having a layer structure that thin metal or nonmetal oxide layers (C) are respectively arranged directly or through an adhesive layer (B) on both sides of a hygroscopic resin layer (A), the process comprising the step of drying the multi-layer film or the hygroscopic resin layer (A) making up the multi-layer film, thereby forming a multi-layer film having:

(1) a water vapor transmission rate of at most 0.05 $g/m^2 \cdot 24$ hr as measured at a temperature of 60° C. and a relative humidity of 90%; and (2) a quantity of water vapor transmission for 50 hours of at most 0.15 $g/m^2$ as measured at a temperature of 40° C. and a relative humidity of 100%.

According to the present invention, there is further provided an electroluminescence device comprising a body of the electroluminescence device, in which a luminescent layer has been arranged between a pair of electrodes, and which has been sealed with a moistureproof material at least a part of which is composed of a moistureproof film, wherein the moistureproof film is a moistureproof film composed of a transparent multi-layer film having a layer structure that thin metal or nonmetal oxide layers (C) are respectively arranged directly or through an adhesive layer (B) on both sides of a hygroscopic resin layer (A), and having:

(1) a water vapor transmission rate of at most 0.05 $g/m^2 \cdot 24$ hr as measured at a temperature of 60° C. and a relative humidity of 90%; and (2) a quantity of water vapor transmission for 50 hours of at most 0.15 $g/m^2$ as measured at a temperature of 40° C. and a relative humidity of 100%.

According to the present invention, there is still further provided a process for fabricating an electroluminescence device comprising a body of the electroluminescence device, in which a luminescent layer has been arranged between a pair of electrodes, and which has been sealed with a moistureproof material at least a part of which is composed of a moistureproof film, the process comprising using, as the moistureproof film, a transparent multi-layer film having a layer structure that thin metal or nonmetal oxide layers (C) are respectively arranged directly or through an adhesive layer (B) on both sides of a hygroscopic resin layer (A), and the step of drying the multi-layer film or the hygroscopic resin layer (A) making up the multi-layer film in such a manner that the moistureproof film has:

(1) a water vapor transmission rate of at most 0.05 $g/m^2 \cdot 24$ hr as measured at a temperature of 60° C. and a relative humidity of 90%; and (2) a quantity of water vapor transmission for 50 hours of at most 0.15 $g/m^2$ as measured at a temperature of 40° C. and a relative humidity of 100%.

BEST MODE FOR CARRYING OUT THE INVENTION

Figure 1:
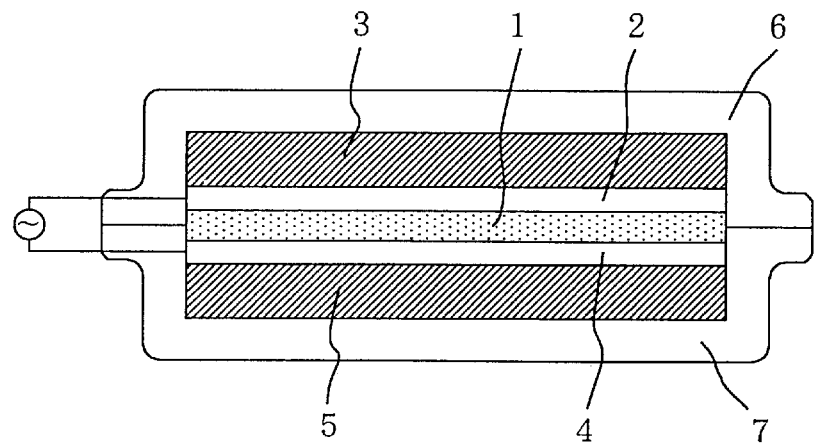
FIG. 1 is a schematic cross-sectional view illustrating an exemplary layer structure of an EL device sealed with a moistureproof film.

FIG. 1 is a schematic cross-sectional view illustrating an exemplary EL device intended by the present invention. The EL device illustrated in FIG. 1 has a structure that an EL device body with a luminescent layer 1 held between a substrate 3 provided with an electrode 2 and a substrate 5 provided with an electrode 4 is sealed between a pair of moistureproof materials 6 and 7. The EL device is so constructed that lead electrodes are respectively connected to the pair of electrodes 2 and 4 to apply an electric field to a luminescent layer 1 by electric power supply from an external power source.

The luminescent layer 1 may be either a dispersion type luminescent layer in which a powdery phosphor is dispersed in an organic or inorganic binder, or a thin film type luminescent layer composed of a thin film of a phosphor. The phosphor may be either an inorganic phosphor or an organic phosphor. The luminescent layer may also be such a hybrid type luminescent layer with a phosphor dispersed in an organic-inorganic composite matrix as disclosed in Japanese Patent Application Laid-Open No. 135080/1995. The substrates 3 and 5 are composed of, for example, a plastic film, glass sheet, metal sheet or the like, and at least one thereof is made transparent so as to transmit light from the luminescent layer outside. Incidentally, the term "transparent" as used herein means that the substrate is transparent to such an extent that light from the luminescent layer can be transmitted.

The electrodes 2 and 4 provided on the respective substrates are formed from a metal or a metal oxide such as ITO (indium-tin double oxide), and at least one thereof is made transparent so as to transmit light from the luminescent layer outside. Accordingly, one of the substrate-electrode composites may be opaque. In such a case, said one substrate-electrode composite (for example, a composite of the substrate 5 and the electrode 4) may be constructed as a combined substrate and electrode by one metal sheet such as an aluminum foil.

Such an EL device body composed of the luminescent layer 1, substrates 3 and 5, and electrodes 2 and 4 is not limited to one, and a plurality of device bodies may be arranged on a plane or vertically laminated to seal them collectively between a pair of moistureproof materials 6 and 7.

At least one of the pair of moistureproof materials 6 and 7 is composed of the moistureproof film according to the present invention, and the other may be composed of a glass base or metal sheet as needed. When one moistureproof material 7 is composed of, for example, a glass base, the substrate 5 thereon may be omitted to provide the electrode 4 directly on the glass base. When the pair of moistureproof materials 6 and 7 are both composed respectively of the moistureproof films according to the present invention, they may be one moistureproof film folded back. As described above, a part of the moistureproof material may be a glass base or metal sheet. Accordingly, the EL device according to the present invention includes an EL device comprising an electroluminescence device body sealed with a moistureproof material at least a part of which is composed of the moistureproof film.

Figure 2:
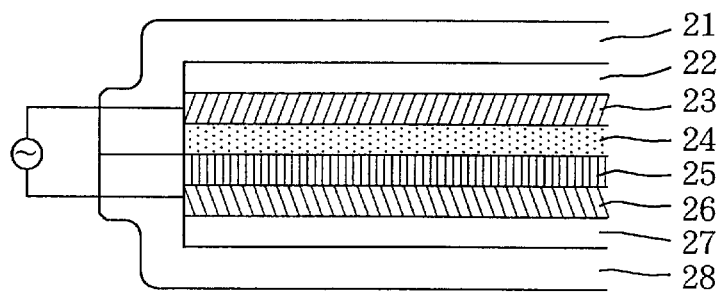
FIG. 2 is a schematic cross-sectional view illustrating another exemplary layer structure of an EL device sealed with a moistureproof film.

FIG. 2 is a schematic cross-sectional view illustrating another exemplary EL device intended by the present invention. The EL device illustrated in FIG. 2 has a structure that a luminescent layer 24 composed of a powdery phosphor bound with an organic binder and a dielectric layer 25 for preventing dielectric breakdown, which is situated on one side of the luminescent layer, are held between a transparent conductive film (ITO) 23 and a back plate or electrode (aluminum foil) 26. In the EL device illustrated in FIG. 2, moisture-absorbing films 22 and 27 for dehumidification are further inserted, and the device body is sealed with moistureproof films 21 and 28 to impart flexibility.

In the present invention, a film composed of a transparent multi-layer film having a layer structure that thin metal or nonmetal oxide layers (C) are respectively arranged directly or through an adhesive layer (B) on both sides of a hygroscopic resin layer (A), and having specific water vapor transmission rate and quantity of water vapor transmission is used as the moistureproof film.

The thin oxide layer (C) may be formed on one side or both sides of the hygroscopic resin layer (A), but may be formed on another transparent resin layer (D). However, the thin oxide layer (C) is provided with the adhesive layer (B) on its surface opposite to the surface on which it has been formed by vapor deposition, thereby bonding the thin oxide layer (C) to another layer, protecting it to prevent the occurrence of cracking and moreover filling the role of further enhancing the moistureproof performance.

The moistureproof film according to the present invention typically includes such basic layer structures as illustrated in FIGS. 3 to 8. Additional layers of the same or different kind may be further laminated thereon as needed.

Figure 3:
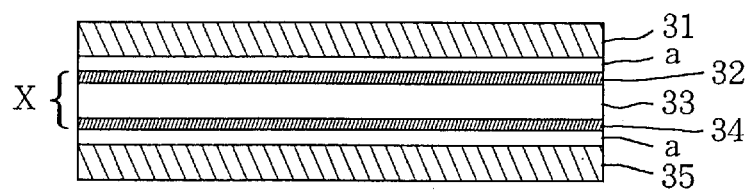
FIGS. 3 to 8 are schematic cross-sectional views illustrating specific examples of the layer structure of a moistureproof film according to the present invention.

FIG. 3 illustrates a layer structure that a composite film X, in which thin oxide layers (C) 32 and 34 have been respectively formed on both sides of a hygroscopic resin layer (A) 33, is used, and transparent resin layers (D) 31 and 35 are respectively laminated on both sides of the composite film through an adhesive layer a.

Figure 4:
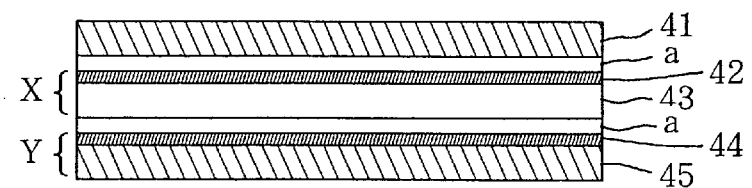

FIG. 4 illustrates a layer structure that a transparent resin layer (D) 41 is laminated on one side of a composite film X, in which a thin oxide layer (C) 42 has been formed on one side of a hygroscopic resin layer (A) 43, through an adhesive layer a, and a composite film Y, in which a thin oxide layer (C) 44 has been formed on one side of a transparent resin layer (D) 45, is laminated on the other side of the composite film X through an adhesive layer a.

Figure 5:
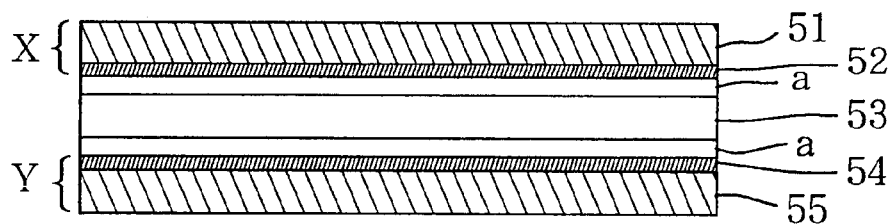

FIG. 5 illustrates a layer structure that a composite film X, in which a thin oxide layer (C) 52 has been formed on one side of a transparent resin layer (D) 51, and a composite film Y, in which a thin oxide layer (C) 54 has been formed on one side of a transparent resin layer (D) 55, are respectively laminated on both sides of a hygroscopic resin layer (A) 53 through an adhesive layer a.

Figure 6:
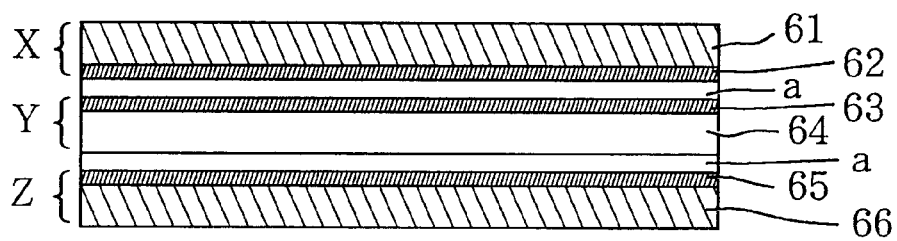

FIG. 6 illustrates a layer structure that a composite film X, in which a thin oxide layer (C) 62 has been formed on one side of a transparent resin layer (D) 61, and a composite film Z, in which a thin oxide layer (C) 65 has been formed on one side of a transparent resin layer (D) 66, are respectively laminated on both sides of a composite film Y, in which a thin oxide layer (C) 63 has been formed on one side of a hygroscopic resin layer (A) 64, through an adhesive layer a.

Figure 7:
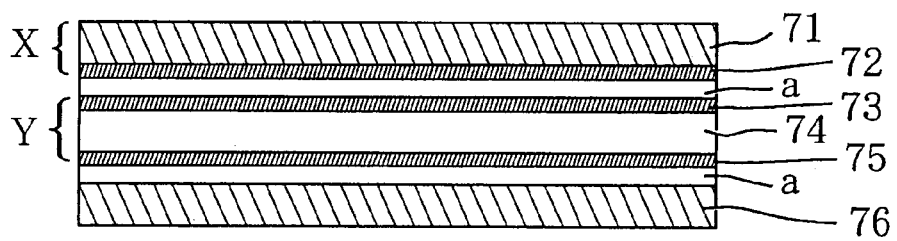

FIG. 7 illustrates a layer structure that a composite film X, in which a thin oxide layer (C) 72 has been formed on one side of a transparent resin layer (D) 71, and a transparent resin layer (D) 76 are respectively laminated on both sides of a composite film Y, in which thin oxide layers (C) 73 and 75 have been respectively formed on both sides of a hygroscopic resin layer (A) 74, through an adhesive layer a.

Figure 8:
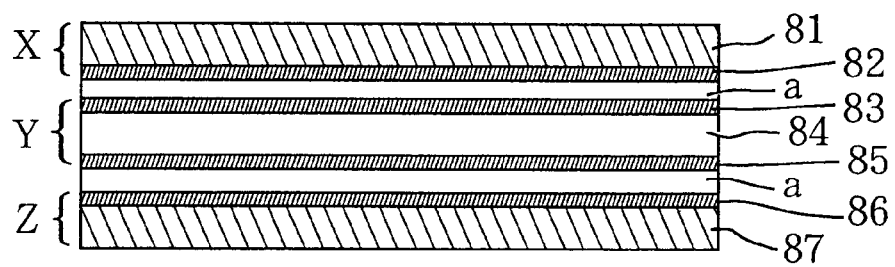

FIG. 8 illustrates a layer structure that a composite film X, in which a thin oxide layer (C) 82 has been formed on one side of a transparent resin layer (D) 81, and a composite film Z, in which a thin oxide layer (C) 86 has been formed on one side of a transparent resin layer (D) 87, are respectively laminated on both sides of a composite film Y, in which thin oxide layers (C) 83 and 85 have been respectively formed on both sides of a hygroscopic resin layer (A) 84, through an adhesive layer a.

Accordingly, the moistureproof films according to the present invention are preferably multi-layer films comprising a layer structure that:

(i) the thin oxide layers (C) are respectively arranged directly or through the adhesive layer (B) on both sides of the hygroscopic resin layer (A), and (ii) a transparent resin layer (D) or a transparent resin layer (D), on which a thin oxide layer (C) has been formed, is arranged directly or through an adhesive layer (B) on each of the thin oxide layers (C), and representative examples of such basic structures may include the following layer structures:

(1) transparent resin layer (D1)/adhesive layer (B1)/thin oxide layer (C1)/hygroscopic resin layer (A)/thin oxide layer (C2)/adhesive layer (B2)/transparent resin layer (D2);

(2) transparent resin layer (D1)/adhesive layer (B1)/thin oxide layer (C1)/hygroscopic resin layer (A)/adhesive layer (B2)/thin oxide layer (C2)/transparent resin layer (D2);

(3) transparent resin layer (D1)/thin oxide layer (C1)/adhesive layer (B1)/hygroscopic resin layer (A)/adhesive layer (12)/thin oxide layer (C2)/transparent resin layer (D2);

(4) transparent resin layer (D1)/thin oxide layer (C1)/adhesive layer (B1)/thin oxide layer (C2)/hygroscopic resin layer (A)/adhesive layer (B2)/thin oxide layer (C3)/transparent resin layer (D2);

(5) transparent resin layer (D1)/thin oxide layer (C1)/adhesive layer (B1)/thin oxide layer (C2)/hygroscopic resin layer (A)/thin oxide layer (C3)/adhesive layer (B2)/transparent resin layer (D2); and (6) transparent resin layer (D1)/thin oxide layer (C1)/adhesive layer (B1)/thin oxide layer (C2)/hygroscopic resin layer (A)/thin oxide layer (C3)/adhesive layer (B2)/thin oxide layer (C4)/transparent resin layer (D2).

In the multi-layer films according to the present invention, at least one additional layer selected from the group consisting of a transparent resin layer (D) and a transparent resin layer (D), on which a thin oxide layer (C) has been formed, may be further arranged directly or through an adhesive layer on at least one side of the multi-layer film of such a basic structure.

The hygroscopic resin layer (A) may be formed with either a resin having hygroscopic property in itself or a hygroscopic resin composition obtained by mixing a hygroscopic or non-hygroscopic resin with a hygroscopic compound such as calcium chloride. Examples of the hygroscopic resin include polyvinyl alcohol (PVA) which is a (partial) saponification product of a polyvinyl acetate, saponification products (EVOHs) of ethylene-vinyl acetate copolymers, and polyamide. Of these, PVA is preferred. PVA desirably has a saponification degree of generally at least 90%, preferably at least 95%, more preferably at least 99%. When the PVA film is used, the initial water absorption can be more lowered the more the drying treatment is thoroughly conducted. In addition, the quantity of water vapor transmission can be lessened. As a result, a moistureproof film having high practical moistureproof performance can be obtained. The moistureproof performance is not impaired even by changes in environmental temperature and humidity.

Example of the non-hygroscopic resin include polyolefins, polyester, polyvinyl chloride, and vinylidene chloride copolymers. The transparency of the hygroscopic resin layer (A) may be somewhat impaired in some cases by adding the hygroscopic compound such as calcium chloride. However, the transparency sufficient to transmit light from the luminescent layer can be satisfactorily retained. The thickness of the hygroscopic resin layer (A) is generally 5 to 400 $\mu$m, preferably 10 to 200 $\mu$m. In the multi-layer film according to the present invention, plural hygroscopic resin layers may be laminated through an adhesive layer as needed. Namely, one or more hygroscopic resin layers may also be arranged as the transparent resin layers (D).

No particular limitation is imposed on the oxide forming the thin metal or nonmetal oxide layer (C) so far as it can provide a thin layer having high transparency and adequate flexibility. Examples of the metal oxide include oxides of Al, Zn, Sn, In and Ti, and oxides of any combinations of two or more of these metals. Typical examples of the nonmetal inorganic oxide include silicon oxides such as SiO, $SiO_2$ and mixtures thereof, and these nonmetal oxides may be particularly preferably used in the present invention. A thin silicon oxide layer may be contaminated with calcium, magnesium, oxides thereof and/or the like so far as the amount of such impurities is small as 10 wt. % or less.

The thickness of the thin oxide layer (C) is generally 10 to 500 nm, preferably 20 to 200 $\mu$m. If the thickness is too thin, the moistureproof performance of the resulting moistureproof film becomes insufficient. If the thickness is too thick, the resulting moistureproof film becomes liable to cause curling, and the thin oxide layer itself becomes easy to cause cracking and/or separation.

The thin oxide layer is generally formed on the hygroscopic resin layer (A) and/or the transparent resin layer (D) by a vapor deposition process, and an adhesive layer is provided on a surface of the thin oxide layer. The moistureproof performance is further enhanced by providing the adhesive layer. An adhesive for forming the adhesive layer may be any of a thermosetting adhesive, a thermoplastic adhesive and an elastomeric adhesive. However, the thermosetting adhesive is preferably used. In any case, it is desirable to subject the adhesive layer to a heat treatment. The heat treatment is preferably conducted for a long period of time at a high temperature so far as the resin components forming the respective layers including the adhesive are not decomposed. The heat treatment is completed in a shorter period of time as it is conducted at a higher temperature, which is preferred from the viewpoint of productivity. It goes without saying that the heat treatment time depends on the layer structure.

The multi-layer films according to the present invention may be suitably provided with additional layers such as a transparent resin layer (D). Therefore, the additional layers will hereinafter be described. When thin oxide layers (C) are respectively formed on both sides of one hygroscopic resin layer (A) as illustrated in, for example, FIG. 3, the flexibility of a multi-layer film comprising such a composite film is generally deteriorated. Therefore, in some cases, such a multi-layer film may be difficult to use in field of which particularly high flexibility is required. When the multi-layer film comprising such a composite film is used as a moistureproof film, cracks occur in the thin oxide layer (C) situated on the outside in particular when the moistureproof film is folded, whereby the moistureproof performance may be impaired in some cases. Accordingly, it is generally preferred that the thin oxide layer (C) be formed on only one side of a film by vapor deposition or the like, and two composite films, on one sides of which the thin oxide layers (C) have been respectively formed, be bonded to each other through an adhesive layer. Namely, it is preferred from the viewpoint of flexibility to adopt the structure that the hygroscopic resin layer (A) is held between a pair of thin oxide layers (C) according to any of the layer structures illustrated in FIGS. 4 to 6.

However, it is possible to use a multi-layer film comprising any of the layer structures illustrated in FIGS. 3, 7 and 8 in an application field of which flexibility is not very required. Even in this case, other transparent resin layers (D) or composite films, on which a thin oxide layer (C) has been formed on one side thereof, are respectively bonded to both sides of the composite film, in which the thin oxide layers (C) have been respectively formed on both sides of the hygroscopic resin layer (A), through an adhesive layer (B), whereby the thin oxide layers (C) can be protected. As the adhesive layer, there is used a layer having a thickness of about 1 to 50 $\mu$m and composed of an adhesive of the urethane, acrylic or polyester type or the like.

Typical additional layers include a transparent resin layer (D) and a transparent resin layer (D) (composite film) on which a thin oxide layer (C) has been formed. A resin for forming the transparent resin layer may be either a hygroscopic resin or a non-hygroscopic resin. Preferable examples of the transparent resin layer (D) composed of a non-hygroscopic resin include stretched or unstretched films composed of polyester, polyolefin, polyvinylidene chloride or the like which is high in moistureproof performance. Besides, as examples of another resin material for forming the transparent resin layer, may be mentioned heat-resistant resins such as poly(phenylene sulfide), polysulfone, polyarylate and polyimide. These resins may be mixed with an ultraviolet absorbent, a pigment for conducting color conversion of an EL device, or the like.

In addition, as the additional layers, there may be used gas barrier films such as a heat-treated film formed from a mixture of PVA and poly(meth)acrylic acid or a partially neutralized product thereof (Japanese Patent Application Laid-Open No. 220221/1994), and a heat-treated film formed from a mixture of a saccharide and poly(meth) acrylic acid or a partially neutralized product thereof (Japanese Patent Application Laid-Open No. 165942/1995), and composite films in which any of these gas barrier films has been formed on at least one side of a thermoplastic resin layer.

The thin oxide layer (C) can be formed on a base film composed of a hygroscopic resin or non-hygroscopic resin by vacuum deposition, ion plating, sputtering or reactive deposition process, or the like. Of these processes, the reactive deposition process is a process in which a metal, a metal oxide or a mixture thereof is used as a deposition material to conduct vapor deposition while supplying oxygen gas. Such a process may also be conducted by using silicon, silicon oxide or a mixture thereof.

Prior to the formation of the thin oxygen layer (C), an anchor coating agent may be used to enhance the adhesion strength between the thin oxide layer and the base film. Preferable examples of the anchor coating agent include adhesion accelerators of the isocyanate, polyethyleneimine and organic titanium types, and adhesives of the polyurethane and polyester types and the like. As the anchor coating agent, there may also be used a solvent-free adhesive of the polyethylene, polyester or polyamide type. Accordingly, the present invention includes the use of the composite film in which a thin oxide layer has been formed on the surface of a base film through any of these anchor coating agents.

It is also preferred that a film of a hygroscopic resin or non-hygroscopic resin be bonded through an adhesive layer or fusion-bonded as a transparent resin layer (D) by itself without forming a thin oxide layer (C) thereon, thereby forming an additional layer. The reason for it is that since the mere lamination of a composite film in which the thin oxide layer (C) has been formed deteriorates the resistance to folding of the resulting multi-layer film, it is effective to enhance the flexibility of the multi-layer film or improve the strength of the external surface thereof.

The thickness of each of such individual films (transparent resin layers) other than the hygroscopic resin layer (A) as described above is generally about 5 to 400 $\mu$m, preferably about 10 to 200 $\mu$m.

As a part of the additional layers, at least one composite film, in which an thin oxide layer (C) has been formed on at least one side of a hygroscopic resin layer or non-hygroscopic resin layer, may be laminated to improve the water vapor barrier property of the whole multi-layer film. In this case, individual composite films may be laminated in such a manner the thin oxide layers thereof face each other through an adhesive layer, or the surface of the thin oxide layer in one composite film face the surface of the transparent resin layer in the other composite film through an adhesive layer.

As an additional layer forming the innermost layer in the multi-layer film according to the present invention, may be mentioned a heat-sealable transparent resin layer. It is also preferred that for example, a hot-melt sealant layer of the polyolefin or epoxy type or the like having a thickness of 10 to 300 $\mu$m be provided for facilitating the bonding to the other moistureproof material. Since such a sealant layer is transparent, it can be said to be a sort of transparent resin layer. Such a hot-melt sealant layer may also be provided on only site(s) of one or both of the moistureproof films according to the present invention, by which an EL device body is surrounded at the stage of sealing the EL device body with the moistureproof films.

As an additional layer forming the outermost layer in the multi-layer film according to the present invention, is preferred a transparent resin layer having high heat resistance. The outermost layer is provided as the heat-resistant transparent resin layer, whereby not only the heat resistance of the resulting EL device can be enhanced, but also the heat sealability of the resulting moistureproof film can be enhanced when it is heat-sealed. As such a heat-resistant transparent resin layer, may be mentioned a thermoplastic resin film having a melting point or Vicat softening point of at least 100° C., preferably at least 120° C., more preferably at least 150° C. More specifically, a stretched or unstretched polypropylene film, or a stretched or unstretched polyethylene terephthalate film may be mentioned.

The total thickness of the multi-layer film including such additional inner and outer layers as described above is not limited so far as the transparency of the multi-layer film is impaired. However, it is often 30 to 1,000 μm, preferably 50 to 500 μm.

The transparent multi-layer film forming the moistureproof film according to the present invention is a film having (1) a water vapor transmission rate (a measure of water vapor barrier property) of at most 0.05 g/m²·24 hr, preferably at most 0.04 g/m²·24 hr, more preferably at most 0.03 g/m²·24 hr as measured under conditions of a temperature of 60° C. and a relative humidity (RH) of 90%, and (2) a quantity of water vapor transmission for 50 hours (a measure of water vapor barrier property affected by the initial water absorption of the multi-layer film) of at most 0.15 g/m², preferably at most 0.13 g/m², more preferably at most 0.10 g/m² as measured under conditions of 40° C. and 100% RH. Most preferably, the quantity of water vapor transmission may be controlled to at most 0.05 g/m².

According to the results of the research by the present inventors, the water vapor transmission rate and the quantity of water vapor transmission show the corresponding relation of 1:1 in the case of an ordinary film so far at various conditions including measuring temperature and time are the same. However, a multi-layer film comprising a hygroscopic resin layer (A), to both sides of which a layer low in water vapor transmission property, such as a thin oxide layer (C), is adjacent, contains some water by absorption of moisture in the hygroscopic resin layer (A) under ordinary conditions for production prior to the formation of the layer low in water vapor transmission property. It has been found that the quantity of water (initial water absorption) contained by this moisture absorption does not essentially affect the water vapor transmission rate, but increases the quantity of water vapor transmission to influence the practical moistureproof performance as a packaging film for EL device. Namely, if the initial water absorption of the hygroscopic resin layer (A) is great, a multi-layer film comprising such a hygroscopic resin layer is affected thereby to show a tendency to increase the quantity of water vapor transmission.

The water vapor transmission rate that defines the multi-layer film (moistureproof film) according to the present invention is a value measured by a filter paper sealing method which will be described subsequently, while the quantity of water vapor transmission is a cumulative quantity of water vapor transmission found by using a water vapor transmission tester (PERMATRAN-W3/31SW) manufactured by Modern Control Co. in accordance with ASTM F 1249 (corresponding to JIS K 7129 Method B). The reason why the measuring methods of the water vapor transmission rate and the quantity of water vapor transmission are different is that although it is required to seek a measuring method that can determine the water vapor transmission rate under conditions suitable for a severe test corresponding to a long-time luminance test for EL device, i.e., such conditions that an EL device is left to stand for 750 hours in an atmosphere of 60° C. and 90% RH, there is no apparatus that can determine the water vapor transmission rate and the quantity of water vapor transmission at the same time under such conditions.

In the present invention, the quantity of water vapor transmission is measured in accordance with the following method. The quantity of water vapor transmission is measured by means of the water vapor transmission tester, PERMATRAN-W3/31SW manufactured by Modern Control Co. in accordance with ASTM F 1249 (JIS K 7129 Method B). More specifically, a flat multi-layer film (specimen) intended for measurement is fixed in a diffuser cell to partition the diffuser cell into a dried chamber and a humidity-controlled chamber by the specimen. Since the whole diffuser cell is kept at 40° C., the temperature of the specimen also reaches 40° C. as the time goes on. The dried chamber is exposed to a dry nitrogen stream, while the humidity-controlled chamber is exposed to 100% RH by using a sponge soaked with distilled water and kept in a nitrogen stream. When the diffuser cell is not partitioned by the specimen, both chambers are in a mixed state of the dry nitrogen stream and the 100% RH. Even after the diffuser cell is partitioned into both chambers by the specimen, for a while, both humidities in the dried chamber and the humidity-controlled chamber do not respectively reach 0% RH and 100% RH that should-be their proper humidities. However, both chambers comes to their proper humidities after about one hour has elapsed after partitioned by the specimen. Therefore, the measurement of the water vapor transmission rate is started from this point of time. Water vapor transmitted to the dried chamber through the specimen is mixed into the dry nitrogen stream and transferred to an infrared sensor. This infrared sensor is used to determine a proportion of infrared energy absorbed in the water vapor, and the proportion thereof is fetched as an electric signal, thereby calculating out a water vapor transmission rate. The water vapor transmission rate is generally determined at intervals of 1 hour. An integrated value (cumulative quantity of water vapor transmission) of the water vapor transmission rate over 50 hours is regarded as the quantity of water vapor transmission. In this measuring method, the quantity of water vapor transmission is determined under conditions of 40° C. and 100% RH. However, since the measurement under conditions of 40° C. and 90% RH may generally be required in some cases, the quantity of water vapor transmission under the conditions of 40° C. and 90% RH can be determined by multiplying the quantity of water vapor transmission obtained by the above-described method by 0.9. It is difficult to directly measure the water content in PVA in a dried multi-layer film. However, its moistureproof performance can be standardized by measuring the quantity of water vapor transmission.

In the present invention, the water vapor transmission rate is measured by the filter paper sealing method. More specifically, filter paper substituted for an EL device is put between 2 multi-layer films and sealed. The sealing is conducted by the same method as a method of sealing an EL device body. More specifically, it is conducted by arranging surfaces sealed with a hot-melt sealant inside in such a manner that their surfaces face each other, or by arranging sealant layers composed of a heat-sealable resin inside in such a manner that their sealant layers are opposed to each other. As the substitute for the EL device, 3 sheets of Whatman filter paper No. 2 having a size of 100 mm×100 mm are dried at 150° C. for 2 hours and then stacked on one another before use. The heat sealing is conducted by causing the multi-layer films to pass through between 2 heated rubber rolls at a sealable temperature so as to seal 4 sides of the multi-layer films by a width (sealing width) of 15 mm. Five filter paper-sealed samples obtained in the above-described manner are left to stand for 750 hours in an atmosphere of 60° C. and 90% RH. The weight increase obtained by this process is expressed as $W_0$. $W_0$ is a total amount of water transmitted through the surfaces of the multi-layer films and the sealed parts until the measurement.

A weight increase measured in the same manner as described above except that an aluminum foil having a size of 100 mm×100 mm and a thickness of 50 μm, the water vapor transmission rate of which is substantially zero, is inserted between the filter paper and each of the multi-layer films is expressed as $W_1$. $W_1$ is also a total amount of water transmitted through the surfaces of the multi-layer films and the sealed parts until the measurement. There is no difference between $W_0$ and $W_1$ in the amount of water transmitted through the sealed parts. $W_1$ is a value measured by preventing the penetration of water by the aluminum foil. Accordingly, a difference ($W_0-W_1$) between both is equal to an amount of water transmitted through the film surfaces of the multi-layer films. More specifically, by this difference, an amount of water perpendicularly transmitted through the area part of 100 mm×100 mm of the film surface of each multi-layer film and absorbed in the filter paper, in other words, a quantity of water vapor transmission as a measure of the moisture transmitting power in a thicknesswise direction in the standardized area of the multi-layer film is determined. A water vapor transmission rate per 24 hours (24 hr) determined from this in accordance with a method known per se in the art is the water vapor transmission rate referred to by the present invention.

It is theoretically not said that the water vapor transmission rate is not affected by the initial water absorption of the multi-layer film. However, since the quantity of moisture absorption measured as a whole is measured under conditions as severe as 60° C., 90% RH and 750 hours, the initial water absorption is such that can be ignored compared with the amount of water transmitted through the films during the measurement. Therefore, the water vapor transmission rate may be used as an important measure of water vapor barrier property excluding the influence of the initial water absorption (the amount of moisture or water absorbed at the beginning).

In order to form a transparent multi-layer film (moistureproof film) satisfying the above-described requirements as to the water vapor transmission rate and quantity of water vapor transmission, it is necessary to take drying conditions into consideration. More specifically, after the moistureproof film according to the present invention, which has thin oxide layers (C) low in water vapor transmission rate adjoiningly on both sides of a hygroscopic resin layer (A), is produced without particularly controlling the amount of water contained in the hygroscopic resin layer (A) by moisture absorption in accordance with the ordinary conditions for production in the course of the production thereof, the amount of water present in the hygroscopic resin layer (A) by moisture absorption cannot be reduced to the prescribed level through the thin oxide layer (C) low in water vapor transmission rate by short-time drying. Accordingly, it is effective to fully dry the hygroscopic resin layer (A) in advance prior to the arrangement of the thin oxide layers (C) directly or through an adhesive layer on both sides thereof in the course of the production of the moistureproof film, or to form the moistureproof film using a hygroscopic resin layer (A) formed in an absolute dry state or a state close thereto. However, once the multi-layer film is formed with the hygroscopic resin layer (A) held between the thin oxide layers (C), the drying step takes a long time. Such drying time varies according to the amount of water already absorbed, the kinds of resins used in layers laminated, the moisture absorbing power of the hygroscopic resin in particular, the degree of barrier of a gas barrier layer, the thickness of each layer, the layer structure (in particular, the number of layers laminated), the number of thin oxide layers (C) and the like, and besides drying conditions.

With respect to the drying conditions, there is preferably used a method in which the multi-layer film or the hygroscopic resin layer (A) making up the multi-layer film is dried for at least 10 hours at a temperature of 35 to 150° C. under atmospheric pressure or reduced pressure. In particular, when drying is conducted after the multi-layer film is formed, the multi-layer film is dried for at least 10 hours, preferably at least 30 hours, more preferably at least 50 hours, most preferably at least 100 hours at a temperature of 35 to 150° C., preferably 40 to 120° C. under atmospheric pressure. Under reduced pressure, the drying is conducted for at least 10 hours, preferably at least 30 hours, more preferably at least 50 hours at a temperature of 35 to 150° C., preferably 40 to 70° C. under a reduced pressure of 1 Torr or lower. When the drying temperature is low, it is preferable to conduct the drying for the longest possible period of time, for example, at least 100 hours, or at least 150 hours in certain circumstances. It is also preferable to combine the drying under atmospheric pressure with the drying under reduced pressure. The multi-layer film, particularly, the hygroscopic resin layer (A) is substantially dried to the absolute dry state by thoroughly conducting the drying as described above. By doing so, the marked moistureproof performance not heretofore known can be achieved, in particular, when the hygroscopic resin layer is a PVA film. The moistureproof performance can be quantified by measuring the above-described quality of water vapor transmission.

The EL device according to the present invention can be provided by using the moistureproof film composed of the multi-layer film obtained in the above-described manner to seal a body of the EL device. In order to seal the EL device body with the moistureproof film, there is adopted a means of imparting sealing performance to the moistureproof film itself, a means of using another sealing material, or a combination thereof.

More specifically, there is adopted (1) a method in which a body of an EL device is placed between two moistureproof films, or a moistureproof film and a glass base (or metal sheet), which is another moistureproof material, with a hot-melt sealant layer provided on one side(s) of the moistureproof film(s) or without providing any sealant layer to seal the periphery thereof with a hot-melt sealant, (2) a method in which transparent layers of a resin having good heat sealability, such as polyethylene are respectively provided as sealant layers on one sides of two moistureproof films, and a body of an EL device is placed between the moistureproof films to seal the periphery thereof by hot-press bonding, or the like. A typical example of the hot-melt sealant is an epoxy resin.

EXAMPLES

The present invention will hereinafter be described more specifically by the following Examples, Comparative Examples and Referential Example. Physical properties in the examples were determined in accordance with the following respective methods.

(1) Quantity of water vapor transmission: As described above.

(2) Water vapor transmission rate: As described above.

(3) Retention of luminance of EL device:

An EL device sample was left to stand for 500 hours under conditions of a relative humidity of 90% and then connected to a power source of operating voltage of 100 V and operating frequency of 400 Hz to measure an initial luminance $L_0$ at room temperature. The EL device sample was then left to stand for 750 hours with the voltage applied thereto to measure a luminance $L_1$, thereby calculating out the retention of luminance in accordance with the following equation:

$$\text{Retention of luminance} = (L_1/L_0) \times 100 \ (\%)$$

Referential Example 1

A biaxially stretched polyethylene terephthalate film coated with a thin silicon oxide layer [silicon oxide vapor-deposition PET film; thickness: 12 μm; "Teckbarrier T" produced by Mitsubishi Kagaku Kohjin Packs K.K.] was used without being subjected to a drying treatment (heat treatment) to measure its water vapor transmission rate. The result is shown in Table 1.

Referential Example 2

The same vapor-deposition PET film as that used in Reference Example 1 was subjected to a heat treatment at 100° C. for 100 hours, and its water vapor transmission rate was then measured. The result is shown in Table 1.

Referential Example 3

A polyurethane type adhesive [thickness: 3.5 μm; "AD-502/CAT-10" produced by Toyo Morton K.K.] was laminated on the thin silicon oxide layer of the same vapor-deposition PET film as that used in Reference Example 1, and a biaxially stretched polyethylene terephthalate film [PET film; thickness: 16 μm; "EMPLET-S" produced by UNITIKA, LTD.] was further laminated thereon to produce a multi-layer film. This multi-layer film was used without being subjected to a heat treatment to measure its water vapor transmission rate. The result is shown in Table 1.

Referential Example 4

The same multi-layer film as that used in Reference Example 3 was subjected to a heat treatment at 100° C. for 100 hours, and its water vapor transmission rate was then measured. The result is shown in Table 1.

TABLE 1

|  | Layer structure | Drying conditions | Water vapor transmission rate (g/m² · 24 hr), 60° C., 90% RH |
| --- | --- | --- | --- |
| Ref. Ex. 1 | PET/SiO | None | 0.5 |
| Ref. Ex. 2 | PET/SiO | 100° C., 100 hr | 0.3 |
| Ref. Ex. 3 | PET/SiO/AD/PET | None | 0.3 |
| Ref. Ex. 4 | PET/SiO/AD/PET | 100° C., 100 hr | 0.2 |

(Note)
(1) PET/SiO: Biaxially stretched polyethylene terephthalate film on which a thin silicon oxide layer had been vapor-deposited.
(2) AD: Layer of a polyurethane type adhesive.
(3) PET: Biaxially stretched polyethylene terephthalate film.

As apparent from the results shown in Table 1, the water vapor transmission rate is improved by the heat treatment (long-time drying treatment). In particular, the multi-layer film, in which the adhesive layer was provided on the thin silicon oxide layer, is subjected to the heat treatment, the water vapor transmission rate is improved to a great extent. However, the base film is not a hygroscopic resin layer, but the PET film, and the PET film is not provided with both thin silicon oxide layer and adhesive layer on both sides thereof. Therefore, the level itself of the water vapor transmission rate is insufficient.

Example 1

Figure 9:
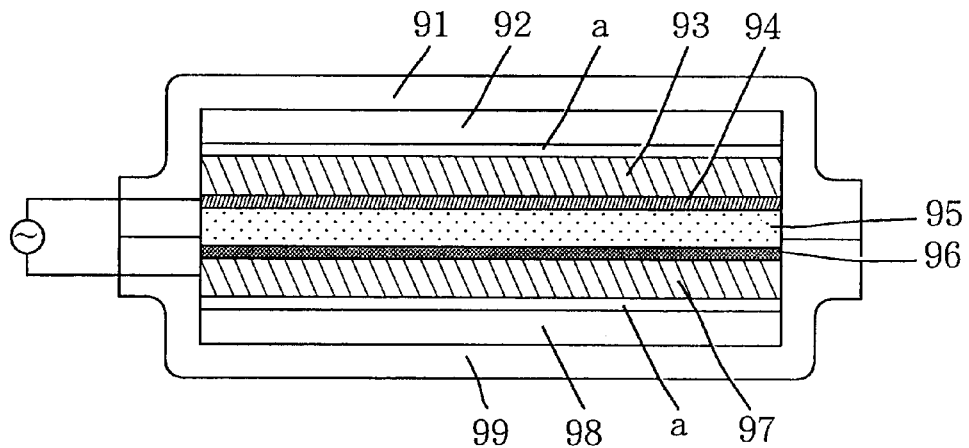
FIG. 9 is a schematic cross-sectional view of an EL device used in Examples of the present invention.

An EL device having a structure illustrated in FIG. 9 was fabricated in the following manner.

Fabrication of EL Device Body

Cyanoethyl polyvinyl alcohol, barium titanate powder and N,N'-dimethylformamide were uniformly mixed to prepare an insulating paste. A powdery phosphor obtained by adding Cu as an activator to cyanoethyl polyvinyl alcohol and ZnS, and N,N'-dimethylformamide were uniformly mixed to prepare a paste for luminescent layer.

An insulating layer 96 (thickness: 30 μm) was formed on a back plate 97 (thickness: 70 μm) composed of an aluminum foil by screen printing using the insulating paste, and a luminescent layer 95 (thickness: 40 μm) was formed thereon by screen printing using the paste for luminescent layer.

A transparent conductive film (thickness: 75 μm), in which a transparent vapor-deposition layer 94 of ITO (indium-tin double oxide) had been formed on a polyethylene terephthalate film 93, was stacked on the luminescent layer 95 to heat and press-bond them by a roller laminator. Electrode lead wires were respectively derived from the back plate 97 and the ITO layer 94 on the transparent conductive film. Both sides of the EL device body thus fabricated were respectively coated with moisture-absorbing films (thickness: 75 μm) 92 and 98 composed of nylon through an adhesive layer (thickness: 30 μm) a composed of an ethylene-vinyl acetate copolymer. This was hereinafter used as an EL device body.

Production of Moistureproof Film

Figure 10:
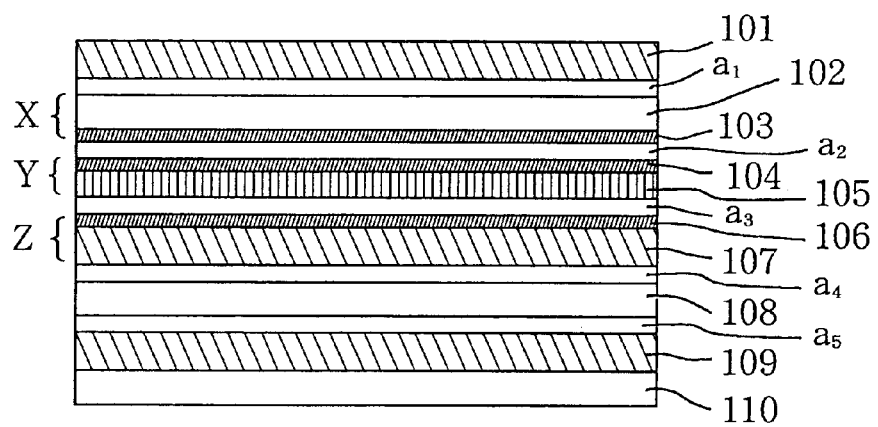
FIG. 10 is a schematic cross-sectional view of a moistureproof film produced in Example 1 of the present invention.

A moistureproof film composed of a multi-layer film the layer structure of which is illustrated in FIG. 10 was produced. The layer structure of this multi-layer film viewed from the outside to the inside is as follows:

Unstretched polypropylene film 101 [thickness: 50 μm; "RXC-18" produced by Tokyo Serofan Co., Ltd.];

Polyurethane type adhesive Layer $a_1$ [thickness: 3.5 μm; "AD-502/CAT-10" produced by Toyo Morton K.K.];

Biaxially stretched polyethylene terephthalate film 102 [thickness: 12 μm; "Teckbarrier T" produced by Mitsubishi Kagaku Kohjin Packs K.K.], on which a transparent thin silicon oxide layer 103 (thickness: 127 nm) has been vapor-deposited;

Polyurethane type adhesive Layer $a_2$ [thickness: 3.5 μm; the same as described above];

Biaxially stretched polyvinyl alcohol film 105 [thickness: 12 μm; "Teckbarrier S" produced by Mitsubishi Kagaku Kohjin Packs K.K.], on which a transparent thin silicon oxide layer 104 (thickness: 51 nm) has been vapor-deposited;

Polyurethane type adhesive Layer $a_3$ [thickness: 3.5 μm; the same as described above];

Biaxially stretched polyvinyl alcohol film 107 [thickness: 12 μm; the same as described above], on which a transparent thin silicon oxide layer 106 (thickness: 51 nm) has been vapor-deposited;

Polyurethane type adhesive Layer $a_4$ [thickness: 3.5 μm; the same as described above];

Unstretched polypropylene film 108 [thickness: 50 μm; the same as described above];

Polyurethane type adhesive Layer $a_5$ [thickness: 3.5 μm; the same as described above];

Unstretched polypropylene film 109 [thickness: 50 μm; the same as described above]; and Polyolefin type hot-melt sealant layer 110 [thickness: 70 μm; EEA type hot-melt adhesive "A710" produced by Mitsui-Du Pont Co., Ltd.].

The transparent multi-layer film of the above-described layer structure was produced by laminating the respective layers at 65° C. through the respective urethane type adhesive layers described above in accordance with a dry laminating process. In FIG. 10, X, Y and Z indicate the respective vapor-deposition films.

The multi-layer film produced in such a manner was vacuum-dried at 45° C. for 150 hours under a reduced pressure of 1 Torr or lower and then stored in a closed can containing a silica gel desiccant. With respect to the moistureproof film composed of the multi-layer film obtained by being subjected to the drying treatment in such a manner, the water vapor transmission rate and quantity of water vapor transmission were measured. The results are shown in Table 2.

Fabrication of EL Device

Two moistureproof films produced above were caused to face each other at the surfaces of their polyolefin type hot-melt sealant layers 110, and the EL device body fabricated above was held therebetween. The films were heated and press-bonded at 140° C. to seal the periphery of the EL device body, thereby fabricating an electrogenerated chemiluminescence type EL device with the EL device body sealed with the moistureproof films 91 and 99. This EL device was used to determine a retention of luminance. The result is shown in Table 2.

Comparative Example 1

A multi-layer film having the same layer structure as in Example 1 was used in the same manner as in Example 1 except that it was not subjected to the drying treatment, thereby conducting measurements of water vapor transmission rate, quantity of water vapor transmission, and retention of luminance of the resulting EL device. The results are shown in Table 2.

Example 2

Production of Moistureproof Film

Figure 11:
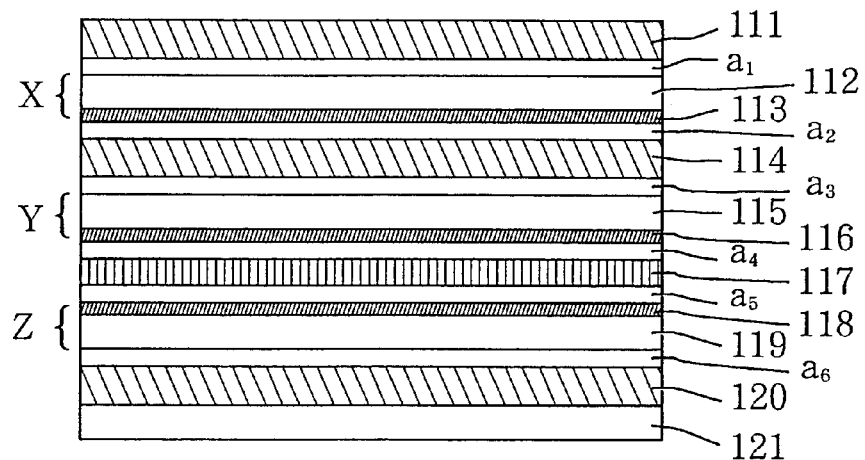
FIG. 11 is a schematic cross-sectional view of a moistureproof film produced in Example 2 of the present invention.

A moistureproof film composed of a multi-layer film the layer structure of which is illustrated in FIG. 11 was produced. The layer structure of this multi-layer film viewed from the outside to the inside is as follows:

Biaxially stretched polyethylene terephthalate film 111 [thickness: 16 μm; "EMPLET-S" produced by UNITIKA, LTD.];

Polyurethane type adhesive Layer $a_1$ [thickness: 3.5 μm; "AD-502/CAT-10" produced by Toyo Morton K.K.];

Biaxially stretched polyethylene terephthalate film 112 [thickness: 12 μm; "Teckbarrier H" produced by Mitsubishi Kagaku Kohjin Packs K.K.], on which a transparent thin silicon oxide layer 113 (thickness: 45 nm) has been vapor-deposited;

Polyurethane type adhesive Layer $a_2$ [thickness: 3.5 μm; the same as described above];

Biaxially stretched polyvinyl alcohol film 114 [thickness: 25 μm; "Boblon" produced by The Nippon Synthetic Chemical Industry Co., Ltd.];

Polyurethane type adhesive Layer $a_3$ [thickness: 3.5 μm; the same as described above];

Biaxially stretched polyethylene terephthalate film 115 [thickness: 12 μm; the same as described above], on which a transparent thin silicon oxide layer 116 (thickness: 45 nm) has been vapor-deposited;

Polyurethane type adhesive Layer $a_4$ [thickness: 3.5 μm; the same as described above];

Biaxially stretched polyvinyl alcohol film 117 [thickness: 25 μm; the same as described above];

Polyurethane type adhesive Layer as [thickness: 3.5 μm; the same as described above];

Biaxially stretched polyethylene terephthalate film 119 [thickness: 12 μm; the same as described above], on which a transparent thin silicon oxide layer 118 (thickness: 45 nm) has been vapor-deposited;

Polyurethane type adhesive Layer $a_6$ [thickness: 3.5 μm; the same as described above];

Biaxially stretched polyethylene terephthalate film 120 [thickness: 16 μm; the same as described above]; and Polyolefin type hot-melt sealant layer 121 [thickness: 50 μm; "Hirodine 7589" produced by Hirodine Kogyo Co., Ltd.].

The respective layers except for the polyurethane type adhesive layer $a_6$, biaxially stretched polyethylene terephthalate film 120 and polyolefin type hot-melt sealant layer 121 were laminated at 65° C. through the respective urethane type adhesive layers in accordance with a dry laminating process to produce a multi-layer film. The film was then dried at 100° C. for 100 hours under atmospheric pressure.

The biaxially stretched polyethylene terephthalate film 120 was then dry-laminated at 65° C. together with the polyolefin type hot-melt sealant layer 121 through the polyurethane type adhesive layer $a_6$, on the surface of the biaxially stretched polyethylene terephthalate film 119 of the multi-layer film, thereby producing a transparent multi-layer film. This multi-layer film was vacuum-dried at 50° C. for 50 hours under a reduced pressure of 1 Torr or lower. With respect to the moistureproof film composed of the multi-layer film obtained by being subjected to the drying treatment in such a manner, the water vapor transmission rate and quantity of water vapor transmission were measured. An EL device was also fabricated in the same manner as in Example 1 except that this moistureproof film was used, thereby determining a retention of luminance. The results are shown in Table 2.

Comparative Example 2

A multi-layer film having the same layer structure as in Example 2 was used in the same manner as in Example 1 except that it was not subjected to the drying treatment, thereby conducting measurements of water vapor transmission rate, quantity of water vapor transmission, and retention of luminance of the resulting EL device. The results are shown in Table 2.

Comparative Example 3

The water vapor transmission rate, quantity of water vapor transmission, and retention of luminance of the resulting EL device were determined in the same manner as in Example 1 except that a poly(chlorotrifluoroethylene) film (thickness: 200 μm) having a polyolefin type hot-melt sealant layer (thickness: 50 μm) on one side thereof was used in place of the moistureproof film in Example 1. The results are shown in Table 2.

TABLE 2

| | Layer structure | Drying treatment | Water vapor transmission rate (g/m$^2$·24 hr), 60° C., 90% RH | Quantity of water vapor transmission (g/m$^2$), 40° C., 50 hr | | Retention of luminance of EL device (%) |
|---|---|---|---|---|---|---|
| | | | | 100% RH | 90% RH | |
| Ex. 1 | FIG. 10 | 45° C., 150 hr, vacuum drying | 0.02 | 0.09 | 0.08 | 87 |
| Ex. 2 | FIG. 11 | 100° C., 100 hr, atmospheric drying/ 50° C., 50 hr, vacuum drying | <0.01 | 0.04 | 0.04 | 88 |
| Comp. Ex. 1 | FIG. 10 | Not conducted | 0.02 | 0.29 | 0.26 | 0 |
| Comp. Ex. 2 | FIG. 11 | Not conducted | 0.02 | 0.20 | 0.18 | 45 |
| Comp. Ex. 3 | PCTFE/ PO | Not conducted | 0.05 | 0.08 | 0.07 | 65 |

(Note)
(1) PCTFE/PO: Poly(chlorotrifluoroethylene) film having a polyolefin type hot-melt sealant layer on one side thereof.
(2) Quantity of water vapor transmission at 90% RH: A value calculated out by multiplying the quantity of water vapor transmission at 100% RH by 0.9.

INDUSTRIAL APPLICABILITY

According to the present invention, there are provided moistureproof films which exhibit a water vapor transmission rate equal to or lower than the conventional moistureproof film composed mainly of poly(chlorotrifluoroethylene) film and have moistureproof performance to the degree equal to or higher than the conventional moistureproof film composed mainly of poly(chlorotrifluoroethylene) film. The moistureproof films according to the present invention can exhibit moistureproof performance stable to changes in environmental temperature and humidity. Accordingly, the moistureproof films according to the present invention are particularly suitable for use as moistureproof packaging films for EL devices. According to the present invention, there are also provided EL devices sealed with the moistureproof film having such excellent moistureproof performance.

What is claimed is:

1. A moistureproof film comprising a transparent multi-layer film having a layer structure wherein thin metal or nonmetal oxide layers (C) are respectively arranged directly on both sides of a hygroscopic resin layer (A), or with an adhesive layer (B) between each thin oxide layer (C) and the hygroscopic layer (A), wherein the moistureproof film has:
   (1) a water vapor transmission rate of at most 0.05 g/m$^2$·24 hr as measured at a temperature of 60° C. and a relative humidity of 90%; and
   (2) a quantity of water vapor transmission for 50 hours of at most 0.15 g/m$^2$ as measured at a temperature of 40° C. and a relative humidity of 100%.

2. The moistureproof film according to claim 1, wherein the multi-layer film having a layer structure further includes a transparent resin layer (D), or a transparent resin layer (D) on which a thin oxide layer has been formed, arranged directly on each of the thin oxide layers (C), or with an adhesive layer therebetween.

3. A moistureproof film comprising a transparent multi-layer film having a layer structure of:
   (1) transparent resin layer (D1)/adhesive layer (B1)/tin oxide layer (C1)/hygroscopic resin layer (A)/thin oxide layer (C2)/adhesive layer (B2)/transparent resin layer (D2);
   (2) transparent resin layer (D1)/adhesive layer (B1)/thin oxide layer (C1)/hygroscopic resin layer (A)/adhesive layer (B2)/thin oxide layer (C2)/transparent resin layer (D2);
   (3) transparent resin layer (D1)/thin oxide layer (C1)/adhesive layer (B1)/hygroscopic resin layer (A)/adhesive layer (B2)/thin oxide layer (C2)/transparent resin layer (D2);
   (4) transparent resin layer (D1)/thin oxide layer (C1)/adhesive layer (B1)/thin oxide layer (C2)/hygroscopic resin layer (A)/adhesive layer (B2)/thin oxide layer (C3)/transparent resin layer (D2);
   (5) transparent resin layer (D1)/tin oxide layer (C1)/adhesive layer (B1)/thin oxide layer (C2)/hygroscopic resin layer (A)/thin oxide layer (C3)/adhesive layer (B2)/transparent resin layer (D2); or
   (6) transparent resin layer (D1)/thin oxide layer (C1)/adhesive layer (B1)/thin oxide layer (C2)/hygroscopic resin layer (A)/thin oxide layer (C3)/adhesive layer (B2)/thin oxide layer (C4)/transparent resin layer (D2),
   wherein the thin oxide layers are metal or nonmetal oxide layers and wherein the moistureproof film has
   (1) a water vapor transmission rate of at most 0.05 g/m$^2$·24 hr as measured at a temperature of 60° C. and a relative humidity of 90%; and
   (2) a quantity of water vapor transmission for 50 hours of at most 0.15 g/m$^2$ as measured at a temperature of 40° C. and a relative humidity of 100%.

4. The moistureproof film according to claim 2, wherein the multi-layer film is further provided with at least one additional layer selected from the group consisting of a transparent resin layer (D3) and a transparent resin layer (D3) on which a thin oxide layer has been formed, directly on at least one side thereof, or with an adhesive layer therebetween.

5. The moistureproof film according to claim 3, wherein the multi-layer film is further provided with at least one additional layer selected from the group consisting of a transparent resin layer (D3) and a transparent resin layer (D3) on which a thin oxide layer has been formed, directly on at least one side thereof, or with an adhesive layer therebetween.

6. The moistureproof film according to claim 2, wherein one of the transparent resin layers (D) is at one surface of the moistureproof film and has high heat resistance.

7. The moistureproof film according to claim 2, wherein one of the transparent resin layers (D) is at one surface of the moistureproof film and is heat-sealable.

8. The moistureproof film according to claim 1, wherein the thin metal or nonmetal oxide layer (C) is a thin silicon oxide layer.

9. The moistureproof film according to claim 1, wherein the hygroscopic resin layer (A) is a polyvinyl alcohol layer.

10. The moistureproof film according to claim 1, which is a moistureproof film for electroluminescence device.

11. The moistureproof film according to claim 9, wherein the polyvinyl alcohol layer comprises polyvinyl alcohol having a saponification degree of at least 90%.

12. The moistureproof film according to claim 2, wherein the transparent resin layers (D) comprise polyester, polyolefin, polyvinylidene chloride, poly(phenylene sulfide), polysulfone, polyacrylate or polyimide.

13. The moistureproof film according to claim 1, having a water vapor transmission rate of at most 0.04 g/m$^2$·24 hr as measured at a temperature of 60° C. and a relative humidity of 90%.

14. The moistureproof film according to claim 1, having a water vapor transmission rate of at most 0.03 g/m$^2$·24 hr as measured at a temperature of 60° C. and a relative humidity of 90%.

15. The moistureproof film according to claim 1, having a quantity of water vapor transmission for 50 hours of at most 0.13 g/m$^2$ as measured at a temperature of 40° C. and a relative humidity of 100%.

16. The moistureproof film according to claim 1, having a quantity of water vapor transmission for 50 hours of at most 0.10 g/m$^2$ as measured at a temperature of 40° C. and a relative humidity of 100%.

17. The moistureproof film according to claim 1, having a quantity of water vapor transmission for 50 hours of at most 0.05 g/m$^2$ as measured at a temperature of 40° C. and a relative humidity of 100%.

18. The moistureproof film according to claim 3, having a water vapor transmission rate of at most 0.04 g/m$^2$·24 hr as measured at a temperature of 60° C. and a relative humidity of 90%.

19. The moistureproof film according to claim 3, having a quantity of water vapor transmission for 50 hours of at most 0.13 g/m$^2$ as measured at a temperature of 40° C. and a relative humidity of 100%.

20. The moistureproof film according to claim 3, having a quantity of water vapor transmission for 50 hours of at most 0.10 g/m$^2$ as measured at a temperature of 40° C. and a relative humidity of 100%.

* * * * *

UNITED STATES PATENT AND TRADEMARK OFFICE
CERTIFICATE OF CORRECTION

PATENT NO.   : 6,432,516 B1
DATED        : August 13, 2002
INVENTOR(S)  : Terasaki et al.

It is certified that error appears in the above-identified patent and that said Letters Patent is hereby corrected as shown below:

<u>Column 20,</u>
Line 9, change "(B1)/tin" to -- (B1)/thin --.
Line 25, change "(D1)/tin" to -- (D1)/thin --.

Signed and Sealed this

Fourteenth Day of January, 2003

JAMES E. ROGAN
*Director of the United States Patent and Trademark Office*